SELECTIVE SIGNAL SYSTEM

Filed Nov. 30, 1954 5 Sheets-Sheet 1

INVENTOR

Joseph P. Caracciolo

BY Smith, Michael and Gardiner

ATTORNEYS

July 3, 1956 J. P. CARACCIOLO 2,753,403

SELECTIVE SIGNAL SYSTEM

Filed Nov. 30, 1954 5 Sheets-Sheet 2

INVENTOR

Joseph P. Caracciolo

BY Smith, Michael and Gardiner

ATTORNEYS

July 3, 1956
J. P. CARACCIOLO
2,753,403
SELECTIVE SIGNAL SYSTEM
Filed Nov. 30, 1954
5 Sheets-Sheet 3

INVENTOR
Joseph P. Caracciolo,
BY Smith, Michael and Gardiner
ATTORNEYS

INVENTOR
Joseph P. Caracciolo,
BY Smith, Michael and Gardiner.
ATTORNEYS

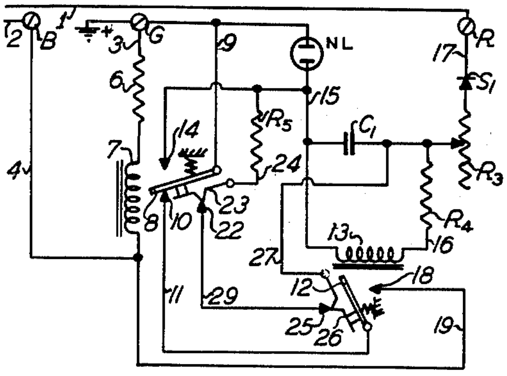
FIG. 13
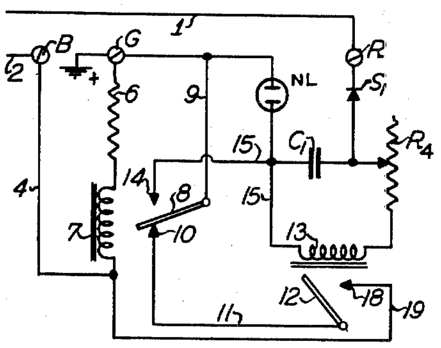
FIG. 14
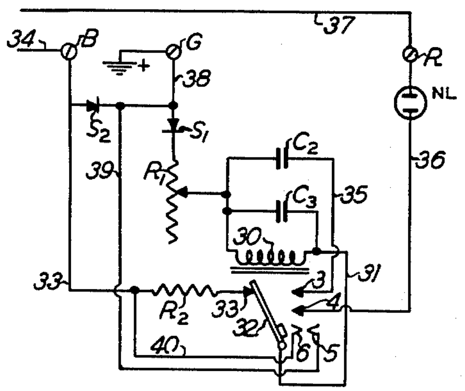
FIG. 15
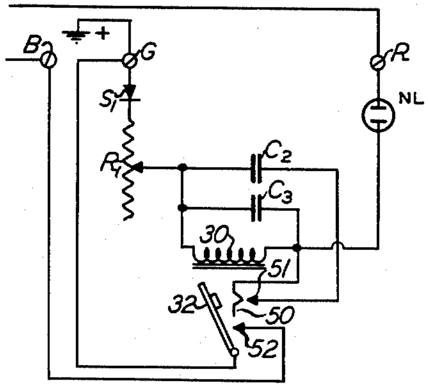
FIG. 16
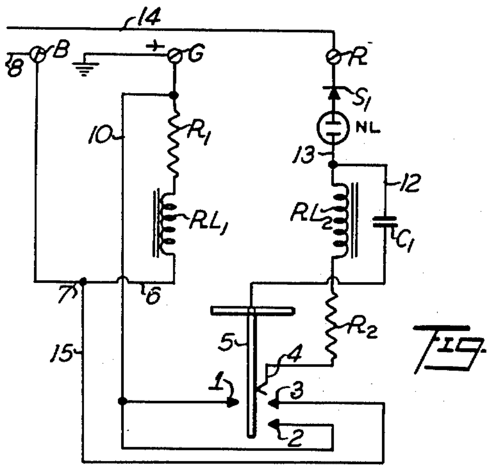
FIG. 17
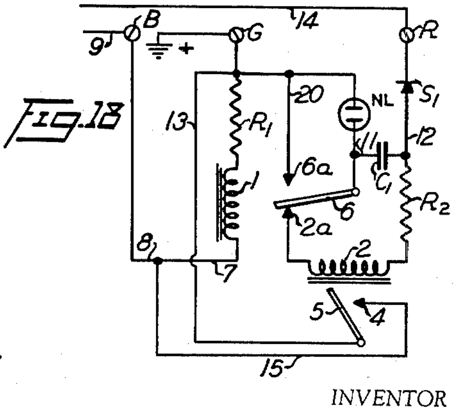
INVENTOR
Joseph P. Caracciolo,
BY Smith, Michael and Gardiner
ATTORNEY United States Patent Office 2,753,403

Patented July 3, 1956

2,753,403

SELECTIVE SIGNAL SYSTEM

Joseph P. Caracciolo, Trenton, N. J.

Application November 30, 1954, Serial No. 471,995

26 Claims. (Cl. 179—84)

This invention relates to selective electrical signal systems wherein any one of a plurality of electric signals may be transmitted over a line to which a plurality of signal receiving stations are connected, and in which each of the receiving stations is provided with circuit discriminator means for selectively passing or blocking the transmitted signal depending upon the duration of the signal current pulse and/or the duration of the intervening interval or pause between successive signal current pulses. More particularly, the invention is designed to provide circuit discriminator means for the selective response of individual telephone subscriber stations connected to a multi-party telephone line so that the ringing equipment in the called station only will respond to a transmitted signal, the ringing equipment in the other connected subscriber stations remaining silent.

One object of my invention is to provide discriminator circuit means designed to be connected between a given subscriber's station set and the telephone line serving said set to render said station fully selective in response to transmitted signals on a multiple party line, without the necessity of any change in the signal transmission equipment of the telephone system.

Another object of the invention is to provide discriminator circuit means which may be conveniently connected between a telephone subscriber's set and the line servicing set without otherwise changing any of the subscriber station equipment.

Another object of the invention is to provide discriminator circuit means of the character indicated, which may be offered to the telephone public as an added feature of telephone service on a monthly rental basis, the nature of the discriminator circuit means of my invention being such that it may be associated with any of the presently used subscriber station equipment, as a matter of choice and without interfering with the proper operation of any other connected telephone equipment not provided with my invention.

Another object of my invention is to provide circuit discriminator means adapted for operative association with the subscriber station equipment of a multi-party telephone line, said circuit discriminator means being designed to selectively block or to pass to the station equipment with which it is associated predetermined ringing signals on the basis of the duration of individual signal current pulses and/or individual intervals or pauses intervening between signal current pulses.

Another object of the invention is to provide discriminator circuit means for selective electric signalling of the character indicated which will be simple in design, efficient in operation, and relatively inexpensive.

Another object of the invention is to provide means within the discriminator circuits of the present invention to insure uniform operation of the relays of such circuits in spite of line and/or ringing voltage fluctuations encountered in rural party line systems.

These and other objects of the invention will become apparent from the following specification read in connection with the accompanying drawings wherein I have illustrated preferred embodiments of my invention.

In the accompanying drawings.

Figs. 13 to 18, inclusive, are the circuits shown respectively in Figs. 2, 3, 5, 7, 9, and 11 modified to include means to insure stable and uniform operation of the relays when subject to fluctuations in line and/or ringing voltage.

The discriminator circuit means of my invention is shown diagrammatically in the figures just referred to, and it will be understood that only so much of the telephone exchange equipment, and of the individual subscriber station equipment, is shown as has any bearing upon the successful operation of my invention. Thus, in connection with the telephone exchange diagrammatically illustrated in Fig. 1, I have shown only the conventional code ringing equipment, and in respect to the several subscriber stations, I have shown only the conventional ringer and condenser.

Figure 1:
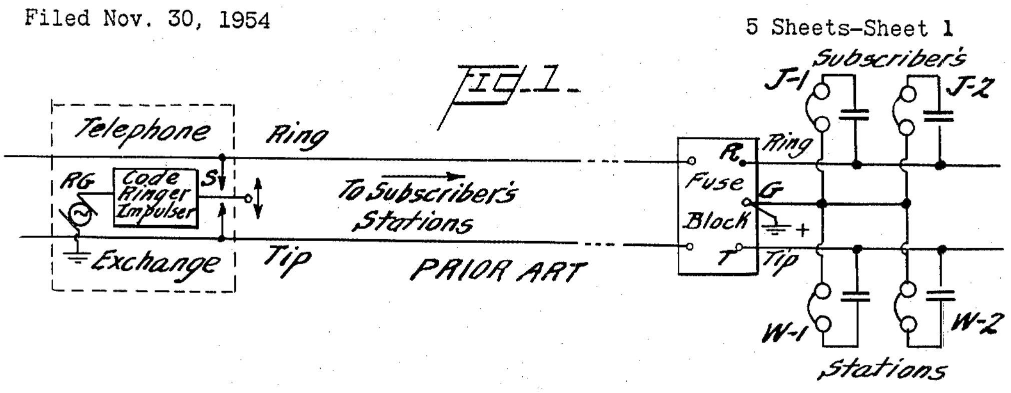
Fig. 1 shows diagrammatically a conventional layout of a telephone exchange and a multiple party line served thereby, without my invention being associated therewith.

Referring more particularly to Fig. 1, I have here shown diagrammatically the conventional arrangement of a multiparty telephone line connected to a telephone exchange. In the telephone exchange there is diagrammatically shown a conventional code ringing interrupter to which is connected a grounded ringing current generator RG of approximately 100 volts A. C. The details of the code ringing interrupter are well known to those skilled in the art and form no part of the present invention. It is sufficient to state that the purpose and function of the code ringing interrupter is to break up the ringing current from the ringing current generator RG into ringing current pulses separated by pauses, both the ringing current pulses and the pauses conforming in duration to a pre-arranged pattern of code ringing signals. The code ringing signals from the code ringing interrupter may be impressed upon either side of the telephone line serving the subscriber's stations by conventional switch means S. The opposite sides of the telephone line are identified in telephone parlance by the terms "ring" and "tip," and the switch means S is arranged to connect the code ringing interrupter between either side of the line and the grounded side of the ringing generator RG. Included within the exchange, but not shown in the drawings, is the usual source of D. C. potential, approximately 50 volts, connected in conventional manner across the tip and ring lines, at all times, with the positive side of said source grounded.

The telephone line at a subscriber's station is connected to to a conventional fuse block, the station side of which is provided with three terminals, conventionally identified as R, G, and T, corresponding to ring, ground, and tip. As previously stated, only the conventional ringing equipment and condenser of the subscriber's stations are shown and following the conventional practice, the two subscriber stations shown in Fig. 1 and connected between the ring side of the line and ground, are identified respectively as J–1 and J–2, while the subscriber stations connected between the tip side of the line and ground are conventionally identified as W–1 and W–2. In present day telephone practice, where multiple party telephone lines are in use, and wherein code ringing is employed for calling the several subscriber stations connected to a given telephone line, it is necessary, where selective signalling is desired, to employ specially designed signal transmitting equipment in the telephone exchange, so that signal currents of different frequency, different polarity, or combinations of these two systems, may be transmitted over the common line to the several subscriber stations to achieve the desired selectivity in response. Where no such expedients are employed and in a conventional prior art system such as shown in Fig. 1, whenever a code ringing signal is applied between the ring side of the line and ground, all subscriber stations connected to the ring side of the line will respond to the transmitted signal, at least in that the ringing equipment of all of these stations will be sounded. Similarly, all signals which are transmitted over the tip side of the line will cause the ringing equipment of all of the subscriber stations connected to this line to be sounded. In these instances, it is necessary for the telephone company to adopt some arbitrary pattern of code ringing to enable the individual subscribers to know when their station is being called. These code ringing signal patterns usually comprise one long ringing current pulse for one of the subscriber stations and two short ringing current pulses for the other subscriber station connected to the same side of the telephone line. The discriminator circuits of the present invention have been designed to discriminate between these conventional ringing signals, namely one long pulse and two short pulses, but it will be understood from what follows and by those skilled in the art, that by proper modification of the circuit characteristics of the individual discriminator circuits, the invention is capable of selectively discriminating between other signal patterns, so long as the basis of differentiation is made on the duration of the signal current pulse and/or the intervening non-signal current pause.

Figures 2, 3:
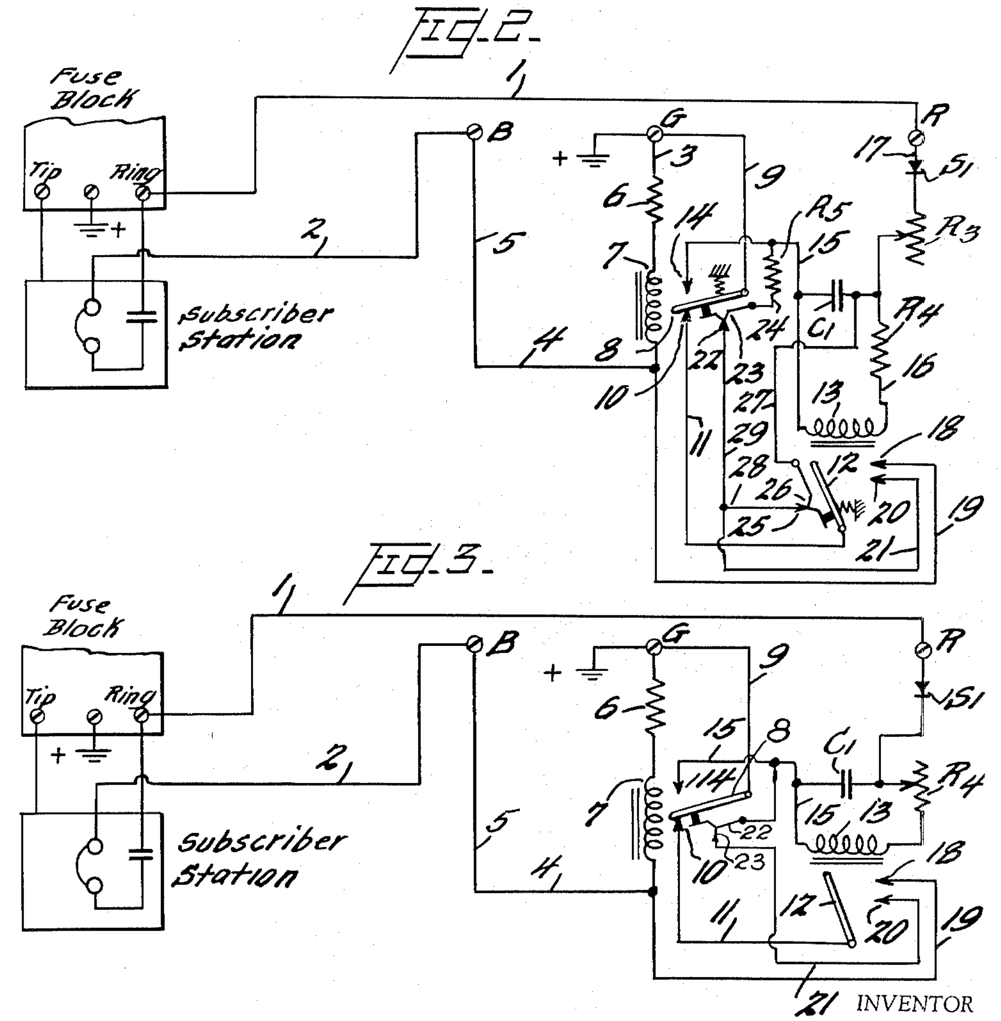
Fig. 2 is a diagram of a discriminator circuit of my invention designed to be connected to the telephone line of Fig. 1 between said line and one of the subscriber stations shown in Fig. 1.
Fig. 3 is a diagram of another discriminator circuit of my invention designed to be connected between the telephone line shown in Fig. 1 and another of the subscriber stations there shown.

It should be noted that under conventional present practice, a given code ringing signal corresponding to a called subscriber station is transmitted over the proper side of the telephone line repeatedly until the called station answers or until the calling station "hangs up." Referring to Fig. 2, I have shown a discriminator circuit of my invention designed to be associated with subscriber station J–1 of Fig. 1 to render said station responsive to a code ringing signal comprising one long signal current pulse and to effectively block or screen said station from other code ringing signals, particularly a code ringing signal comprising two short ringing current pulses. For the purposes of the present discussion, it will be assumed that the one long ringing current pulse signal will be a ringing current pulse of two seconds duration, and that the automatic code ringing transmitting equipment in the telephone exchange will repeat said signal at intervals of seven seconds, so that when this signal is being transmitted it will comprise a series of ringing current pulses of two seconds duration each, separated by intervening pauses of seven seconds each. The subscriber's station set is represented by the block designated "Subscriber station" and includes the conventional ringing equipment and condenser diagrammatically shown within said block. The ring side of the fuse block is connected by a conductor 1 to terminal R of the discriminator circuit while the tip side of the fuse block is connected to the subscriber station in the usual manner. The ground terminal of the fuse block is grounded as shown and the ringing equipment of the subscriber station is connected by the conductor 2 to the terminal B of the discriminator circuit. The ground terminal G of the discriminator circuit is connected to ground as shown, and to the terminal B by conductors 3, 4, and 5. The connection between G and B just described includes a resistor 6 and a relay coil 7 of a first relay. Thus, the ringing equipment of the subscriber station is connected to ground through the resistance 6 and the relay coil 7. The opposite side of the subscriber station ringing equipment including the condenser is connected to the ring terminal of the fuse block as shown. The relay coil 7 is arranged to actuate the relay armature 8 which is connected to the ground terminal G by the conductor 9. The relay armature 8 is shown in its normal position with the relay deenergized and in such position closes a back contact 10 which is connected by conductor 11 to the armature 12 of a second relay, the coil of which is indicated at 13. The energizing circuit for the relay coil 13 includes a front contact 14 for the armature 8 of the first relay which is connected to said relay coil 13 by conductor 15. The other side of said relay coil 13 is connected to terminal R of the discriminator circuit by conductors 16 and 17. The circuit between the terminal R and the front contact 14 includes a rectifier S1, a variable resistor R3, and a fixed resistor R4. Across the relay coil 13 is a shunt connected condenser C1. The armature 12 of the second-mentioned relay has associated therewith a front contact 18 connected by conductor 19 to relay coil 7 and to conductor 4 as shown. A second front contact for armature 12 is provided at 20 and is connected by conductor 21 through first relay back contacts 22 and 23, conductor 24, and resistance R5 to conductor 15 and front contact 14. The contacts 22 and 23 just referred to are normally biased to open position, and move to open position when the armature 8 moves into engagement with its front contact 14, but are normally retained closed by the armature in its de-energized position. A similar pair of back contacts 25 and 26 is associated with the armature 12 and is held engaged by said armature in the deenergized condition of the relay, but said back contacts 25 and 26 move to open position when the armature is moved to engage its front contacts 18 and 20. The armatures 8 and 12 may be biased to the position shown by spring means not shown.

With the discriminator circuit of Fig. 2 connected as shown to the fuse block and assuming the discriminator circuit is associated with the subscriber station J–1 of Fig. 1, and that the code ringing signal for said station is one long signal current pulse, namely a signal pulse of two seconds duration repeated at intervals of seven seconds, the operation is as follows: During the half cycle when G assumes a negative polarity, current will flow from G terminal on my device, through conductor 3, resistance 6, relay coil 7, conductors 4—5, conductor 2, through the bell and the station condenser, and to the positive ring terminal. When terminal G assumes a positive polarity and the ring terminal a negative polarity, current will flow in the opposite direction, discharging the station condenser and reversing the flow procedure already described. Thus, it is seen that current will flow, with each ringing pulse, through relay coil 7 and through the bell. However, the bell will not ring because the combined resistance of 6 and the relay coil 7 is sufficient to cause a considerable voltage drop, with the result that the voltage at the bell is much below that required to ring the bell. Relay 7—8, however, is of the sensitive type, operating on a fraction of the current required to operate the bell. Therefore, with the initial ringing current pulse, the bell will not be energized sufficiently to ring, but relay 7—8 will be actuated instantly. Upon actuation, contact arm 8 closes with contact 14, completing the energizing circuit for relay 12—13 as follows: Conductor 9, through contact arm 8, to contact 14, along conductor 15, through relay coil 13, conductor 16, resistance R4, through adjustable resistance R3, rectifier S1, and along conductor 1, completing the circuit to ring terminal. Since actuating of relay 7—8 is instantaneous, relay 12—13 will receive a two-second current pulse. However, the circuit of relay 12—13, which is comprised of capacitor C1 and resistances R4 and R3, is designed to render this relay slow acting and such that relay 12—13 will not pick up until it has received current for a period substantially more than one second and slightly less than two seconds. Thus, during the two-second ringing pulse, actuation of relay 12—13 will not take place for the first second, but will operate, for example, after the current has been applied for approximately one and a half seconds. Upon actuation, contact arm 12 will close with contact 18, which connects directly to the bell or ringer circuit of the station. Although the ringing current will continue for another half second, the bell will not ring because armature 8 of relay 7—8 must be in the inoperative position before the bell circuit is completed directly to ground through back contact 10. Upon cessation of the first two second current pulse, relay 7—8 is released and armature 8 returns to normal, closing with contact 10 which connects with armature 12 of relay 12—13. The circuit of relay 12—13 including C1, R3, and R4 is designed to provide a holding effect as well as a delayed pick up. Thus, after relay 12—13 is once actuated, the charge in C1, following cessation of a ringing pulse, will discharge slowly through resistance R4 and through the coil winding 13, continuing to hold up the armature 12. Variation of the values of C1 and R4 may be made to provide a wide latitude of holding periods, depending upon the intervals or pauses comprised in the transmitted signal. The resistance of R3 works with C1 to provide the lag period previously mentioned, and this lag period can also be varied by adjusting either the resistance of R3 or by variation of the capacity of C1. In the assumed instance of an interval or pause of seven seconds, the values of C1 and R4 are such that they will hold relay 12—13 in operation for a period substantially longer than the seven second pause between long rings, as for example, ten seconds.

Thus, after the first two second pulse ceases, relay 7—8 returns to normal and relay 12—13 remains in the operated position. When relay 7—8 returns to the deenergized position, it closes back contact 10, which connects to armature 12, which is now closed with contact 18, which connects directly to the station bell through conductors 19—4—5—2. When the second ringing pulse appears, it will be seen that the current will flow through 9 around resistance 6 and relay coil 7, and directly to the bell as follows: From G, along conductor 9, through contact arm 8, to contact 10 and through conductor 11, to contact arm 12, to contact 18, along conductor 19, to conductors 4 and 5, along conductor 2, to the bell and through station capacitor and to the ring terminal. Thus, relay 7—8 is by-passed and thus will not operate, keeping contacts 8 and 10 constantly closed, and inasmuch as the resistance of 6 and the relay coil 7 are no longer in the bell circuit, the bell will receive the full voltage and ring with each subsequent current pulse. It will be noted that inasmuch as relay 7—8 is not now energized, no current can be applied to relay coil 13 through contact 14, but in order to maintain relay coil 13 energized through intervals or pauses, each ringing current pulse after the initial pulse must flow through the relay circuit including C1, R3, and R4. Therefore, I provide a front contact 20 on relay 12—13 to close an auxiliary energizing circuit for the relay coil 13. Inasmuch as contact arm 12 is electrically connected to G through conductor 11, contact 10, and conductor 9 once armature 8 of relay 7—8 returns to release position, the current which, during the initial pulse flowed through conductor 9, armature 8, and contact 14 to relay coil 13, now will flow through contact 20, along conductor 21, through contacts 22 and 23 of relay 7—8, through resistance R5 and conductor 15 to relay coil 13. R5 is of a very low resistance and is included in the circuit merely as a spark eliminator for contacts 22 and 23. Contacts 22, 23, 25, and 26 control an auxiliary discharge circuit for the condenser C1 which I provide to discharge the capacitor C1 of any undesired charges. These contacts function during the discriminating action of my invention and their operation will be explained later. Thus, for each subsequent long ringing signal current pulse, the station bell or ringer will audibly respond, the relay coil 13 being maintained energized through intervening pauses by the holding action of the circuit C1—R4. This action continues so long as the "long" signal is repeated at the prescribed intervals or until the called station answers.

Having described how my invention as illustrated in Fig. 2 permits ringing of the bell J-1 with a long ring signal current, it remains to show how discrimination against a ringing signal of two short pulses is obtained: When the first half of the two-ring signal is applied across G and R of my device, current will flow through relay coil 7 as previously described, and relay 7—8 will operate to impress current upon relay 12—13. The circuit of relay coil 12, however, is so designed, as previously mentioned, that it will not pick up unless current has been applied for substantially more than one second. Therefore, assuming the two short ring signal consists of two rings of one second duration each, separated by an intervening pause of one second duration with a pause between transmitted signals of four seconds, relay 12—13 will not operate or pick up during the first current pulse. However, during the one-second pulse, C1 develops a charge and inasmuch as the rate of discharge of C1 through R4 and the relay coil 12 is so slow as to retain most of that charge during the one-second pause which exists between the short rings, the next one-second pulse would, if not prevented, charge C1 sufficiently to actuate relay 12—13. To rid C1 of these undesired charges, the auxiliary discharge circuit previously referred to and including contacts 22, 23, 25, and 26 is provided. It is to be noted that these contacts are electrically insulated from contact arms 8 and 12, respectively.

The auxiliary discharge circuit for C1 is controlled by contacts 22, 23, 25, 26 as follows: During the first one-second pulse, contact arm 8 has been actuated into contact with 14, opening contacts 22 and 23 to prevent shorting of the current which is applied to relay coil 13 through 9—8—14. When the first one-second current pulse ceases, it is necessary to rid C1 of whatever charge has developed. Thus, when contact arm 8 returns to normal, it closes contacts 22 and 23 and, inasmuch as relay coil 13 did not operate because it has received only a one-second current pulse, contacts 25 and 26 remain closed. Thus, a discharge circuit for C1 is closed as follows: C1, conductor 27, contacts 25—26, conductors 28—29, contacts 22—23, conductor 24, resistance R5 and conductor 15, to the other side of C1. Inasmuch as it is necessary to retain the charge in C1 once relay 12—13 has operated, contacts 25 and 26 will open upon actuation of relay 12—13, thus preventing discharge of C1, even though relay 1 returns to normal. Thus, this circuit of my invention discriminates against the signal of two short rings and passes the signal of one long ring. Thus, when the circuit of Fig. 2 is connected between station J–1 and the telephone line of Fig. 1 and there is a code call of one long ring for J–1, the ring will be received at that station and at J–2 of Fig. 1 also, because that station as shown has no circuit discriminator means associated therewith. However, if J–2 were called by a code signal of two short rings, J–1 would not respond to the two short rings because of the discriminating action of my invention just described.

Assume now that J–2 also desires selective signalling. Fig. 3 illustrates a discriminator circuit of the invention which will so function when installed at J–2. This device discriminates on a basis of the duration of the pauses and may therefore be called a pause discriminator. It will be noted that this circuit is basically the same as that illustrated in Fig. 2, but omits contacts 25, 26 of Fig. 2, and the associated discharging circuit including the resistance R5. Operation of the circuit of Fig. 3 is as follows: When the ringing current appears across the G and ring terminals on the fuse block, current will flow from G on my device, through dropping resistor 6, through the relay coil 7, along conductors 4—5, along conductor 2 to the bell or station ringer, through the bell and station capacitor and completing the circuit to the ring terminal. Although this current will operate the sensitive relay 7—8, it will not ring the bell as a result of the considerable voltage drop brought about by the combined resistance of 6 and the resistance of the relay solenoid coil 7. Inasmuch as operation of relay 7—8 is instantaneous, the closing of contact arm 8 with contact 14 will complete the energizing circuit for relay coil 13 through said contact 14, conductor 15, through relay coil 13, through R4, through rectifier S1, to terminal R of my device and through conductor 1 to the ring terminal on the fuse block. As a result, relay 12—13 circuit will receive an energizing current during most of the one-second pulse. The circuit of relay 12—13 of Fig. 3 omits the time delay pick up resistor R3 of Fig. 2, so that no lag or delay in pick up operation of said relay is provided for. Thus, closing of contact arm 8 with contact 14 will result in almost immediate operation of relay 12—13. However, once relay 12—13 is actuated, the circuit constants of said relay due to resistor R4 are such that there will be a holding action for a period of appreciably more than four seconds but substantially less than seven seconds. It will be remembered that intervals or pauses of four seconds are provided between repeated transmission of a signal comprising two short pulses, and that a similar pause of seven seconds is provided between repeated transmissions of the one long pulse signal. When relay 12—13 is operated, it closes contact arm 12 with contacts 18 and 20. However, although contact 18 connects directly to the station bell, the bell will not ring until contact arm 8 returns to normal and closes with contact 10. When the first one-second pulse ceases, relay 7—8 releases its armature closing contact arm 8 with contact 10. Relay 12—13, however, remains actuated as a result of the holding action provided by the capacitor C1 and the resistance R4. There will be a pause of one second and then another one second ringing pulse. During this next pulse, relay 7—8 will not operate due to the fact that the current now by-passes it, flowing from G, along conductor 9, through contact arm 8, to contact 10, along conductor 11, to contact arm 12 (which is now in actuated position, as previously described), through contact 18, along conductor 19 to conductor 4—5, along conductor 2 and to the station bell. Thus, the bell will ring on the second and all subsequent short pulses. Inasmuch as the failure of relay 7—8 to operate after the first one second pulse will result in failure of contact 14 to close the circuit for relay 12—13, it would appear that relay 12—13 and its associated circuit would receive no further energizing pulses and eventually open contacts 18 and 20. However, to continue these pulses, I provide an auxiliary energizing circuit for the coil 13, connected to contact 20, said circuit including the conductor 21 which is electrically connected to contact conductor 15 through normally closed relay contacts 22—23. Thus, although contact 14 on relay 7—8 will remain open during all current pulses after the initial pulse, contact arm 12 will have closed with contact 20 providing a closed circuit for the relay and thus receiving all subsequent charges or pulses.

The discriminating action of the circuit of Fig. 3 against a ringing signal of one long ring is as follows: When the first long ring is applied to the circuit, relay 7—8 and relay 12—13 will operate as previously described. At the cessation of the long ring, there will be a pause of seven seconds. Although relay 7—8 has again returned to normal, relay 12—13 is in a holding position due to the delayed release action thereof. The delay in the release of relay 12—13 is substantially more than four seconds, but less than seven seconds. This is accomplished by proper design in values of C1 and R4. Thus, before the next long ring pulse appears, relay 12—13 will also have dropped out and returned to normal, opening the station bell contact 18. When the next long ring pulse is applied, the same action takes place, and again relay 12—13 will break before the subsequent ringing pulses, thus effectively blocking the long ring signal.

The discriminator circuit shown in Figs. 2 and 3 when operatively associated with the respective subscriber stations identified as J–1 and J–2 of Fig. 1 will render these stations fully selective in respect to repeated, transmitted code signals on the telephone line to which they are connected, and station J–1 will respond by an audible ringing signal to a long ringing current pulse of two seconds' duration repeated at seven second intervals, while effectively blocking out two short signal current pulses of one second's duration each, separated by a pause of one second and the signal repeated at intervals of four seconds. Similarly, station J–2 will receive and respond to the signal comprising two short signal pulses and block out the one long signal pulse. It will be understood, of course, that while I have shown and described in detail the discriminator circuit of Figs. 2 and 3 associated with subscriber stations J–1 and J–2, a discriminator circuit such as shown in Fig. 2 may be operatively associated with station W–1 of Fig. 1 and a discriminator circuit substantially as shown in Fig. 3 may be operatively associated with subscriber station W–2 of Fig. 1, and thus the entire multi-party line system of Fig. 1 be made completely selective.

As a further development of my invention, it is to be noted that often, as in telephone circuits, it is desired to operate an alternating current electrical device, such as a bell or relay from conductors on which there is applied a direct current potential as well as an alternating current. If the relay, for example, were connected directly to the conductors, a direct current would flow through the relay. If it is desired, as in telephone circuits, to block the flow of this direct current, a blocking condenser is placed in the circuit in series with the device, and between it and the conductor. As a result, direct current will not flow, but alternating current will flow as a result of the charging and discharging action of the condenser. However, if one wishes to use a relay circuit providing a delay and/or holding action, this would not be possible by the simple expedient of a condenser used as just described, inasmuch as this effect can be achieved only by the application of a D. C. potential across the capacitor employed to give the desired delayed action.

Figures 4, 5, 6, 7:
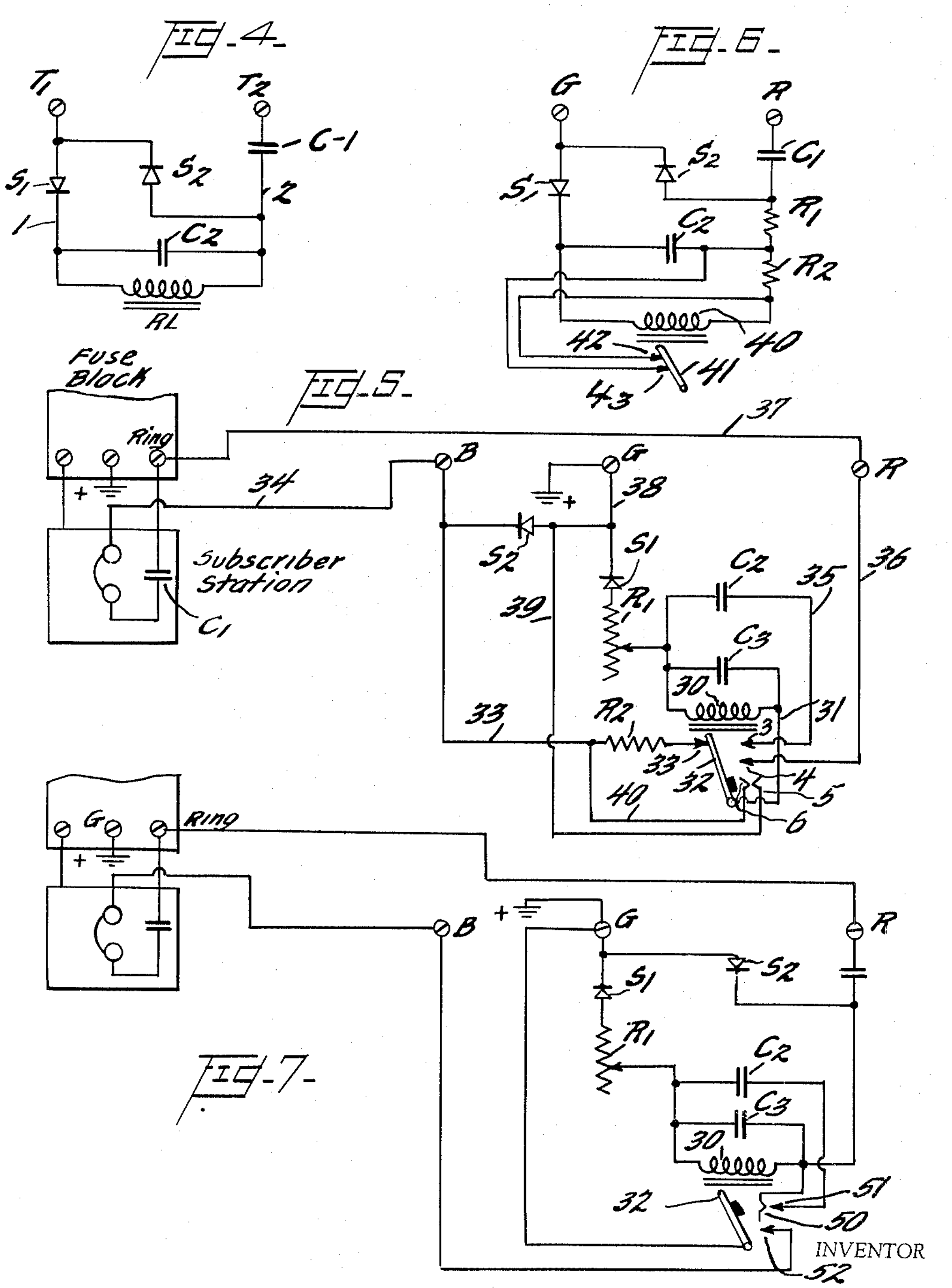
Fig. 4 is a diagram of a relay circuit designed to be used in connection with a line in which both direct current and alternating current is flowing, said circuit being provided with means for excluding the direct current from the relay circuit.
Fig. 5 shows diagrammatically a discriminator circuit embodying the features of Fig. 4.
Fig. 6 shows diagrammatically a modified form of the discriminator circuit shown in Fig. 5.
Fig. 7 is a diagram of a circuit employing only a single relay.

In Fig. 4 I have shown, by way of example, a simple circuit arranged for providing delayed action for an A. C. relay connected to a circuit from which the A. C. energizing current for the relay is supplied and in which circuit a D. C. potential also is present. In Fig. 4 an A. C. relay RL is shown connected to terminals $T^1$ and $T^2$ by conductors 1 and 2, respectively, there being a rectifier S1 included in series between one end of the coil RL and the terminal $T^1$ and there being a condenser C1 included in series between the other end of the coil RL and the terminal $T^2$. Shunted across the coil RL between the conductors 1 and 2 is a condenser C2 and paralleling the condenser shunt is a rectifier S2 connected at one end to conductor 2 between the coil RL and the condenser C1 and connected at the opposite end to conductor 1 adjacent the terminal $T^1$ and between said terminal and the rectifier S1. The rectifier S1 delivers current to the coil RL and the rectifier S2 delivers current from conductor 2 to conductor 1. In operation, the terminals $T^1$ and $T^2$ are connected across a line in which both A. C. and D. C. currents may flow. Thus, when terminal $T^1$ is negative during one-half of the A. C. cycle, current will flow from $T^1$ through S1, through the relay RL and condenser C2, through C1 and to the terminal $T^2$. Current will not flow through S2, however, inasmuch as it is so connected in the circuit that current can flow only when terminal $T^1$ is positive. During the half cycle when terminal $T^1$ is positive and terminal $T^2$ is negative, current cannot flow through the relay and rectifier S1, but it can now flow through S2 to terminal $T^1$, thus discharging the condenser C1. As a result, when terminal $T^1$ again becomes negative, condenser C1 is ready to receive another charge and current will continue to flow. Thus as a result of this circuit, it is possible to achieve delay and holding characteristics with A. C. current in spite of the use of a D. C. blocking condenser in the circuit. I mention at this point that another purpose of the D. C. blocking condenser as used in telephone lines is to keep the lines "open" in the sense that a check for shorts across the lines will not result in a permanent reading. It is the practice of telephone service men to make regular checks at the central office for possible direct or high resistance shorts across the lines. Since these are made with the usual ohmmeters using D. C. current, no permanent reading will result so long as the lines are completely open.

Having explained the operating characteristics of the circuit, shown in Fig. 4, reference is now made to Fig. 5, wherein there is shown a pulse discriminator circuit employing only a single relay and embodying the novel features of the circuit of Fig. 4. The circuit of Fig. 5 operates to pass a code signal of one long ringing pulse and to block out a code signal of two short ringing pulses, in the following manner: When a long ring pulse appears across G and R terminals, and, during the half cycle when G is negative, current will flow from G to the rectifier S1, through resistance R1, through the relay coil 30, conductor 31, relay contact arm 32, through contact 33, through resistance R2, along conductor 33, to terminal B, along conductor 34, through the bell circuit, and to the ring terminal. Although the current is flowing through the bell, it will not operate as a result of the considerable voltage drop across R1, the relay coil 30 and R2. The time period of the relay circuit is such that there will be a delay in the pick up of substantially more than one second but less than two seconds. Thus, inasmuch as the one long ring is of a two-second duration, the relay will operate after a predetermined delay. When operated, contact arm 32 will close with contacts 3 and 4, contact 3 placing capacitor C2 in the relay circuit by way of conductor 35 to provide a holding action for the relay for a period of over seven seconds. At the same time, closing of contact 4 removes the relay coil 30 out of the bell circuit and connects it directly to terminal R of my device through conductors 36—37 and all subsequent ringing pulses will be applied directly to the relay circuit. When the relay operates, it also closes contacts 5 and 6 which are insulated from contact arm 32, thus placing a direct circuit on the bell as follows: from G, along conductors 38—39, to contacts 5 and 6, along conductor 40, along conductor 33, to terminal B, along conductor 34 and to the bell. All subsequent pulses will now ring the bell. It will be noted that conductor 40 by-passes R2. Reason for this will be explained later. During this time, contacts 3 and 4 also have been closed with contact arm 32. Relay current will now flow from G, through rectifier S1, through resistance R1, through the relay coil 30 to contact arm 32, to contact 4, along conductor 36 to terminal R, along conductor 1 and to the ring terminal. The current, also, will flow from contact arm 32 to contact 3, and along conductor 35, charging capacitor C2 which provides the holding action. The purpose of resistance R2 in the circuit is explained as follows: It will be noted that in the circuits previously described, no delay or holding action is required for the relay which is connected in series with the station bell. Thus, whatever current reaches the bell must pass through the relay. However, in the circuit illustrated in Fig. 5, it will be noted that a capacitor C3 is shunt connected across the relay coil 30. Current will flow through C3 and the bell during each ringing pulse, and as a result, not all of the current reaching the bell passes through the relay. Thus, the resistance required in this circuit to provide the necessary voltage drop to prevent the bell from ringing, will have to be greater than that required in the other two circuits. If this resistance were placed in the circuit at $R_1$, which is before the relay, the relay could be made to operate satisfactorily so long as $C_2$ is out of the circuit, but upon actuation of the relay, $C_2$ which has a very high capacity, is placed in the circuit, drawing current and causing an additional voltage drop across $R_1$. This voltage drop would be sufficient to prevent effective energization of the relay circuit during each subsequent ringing pulse, and the relay would then open prematurely and open the bell circuit. To preclude this possibility, I include in the circuit at $R_1$ only enough resistance to provide the required voltage across the relay circuit when once the relay has operated and $C_2$ has been placed into the circuit. The balance of the resistance I add after the relay at $R_2$. Thus, once the relay has operated, $R_2$ is eliminated and the only dropping resistance in the circuit is $R_1$, including, of course, the resistance of the balance of the circuit. This will then insure effective energization of the relay circuit.

The rectifier $S_2$ is so connected in the circuit that it will discharge the condenser $C_1$ in the subscriber telephone set during each half of the cycle when G is positive and the ring terminal is negative, thus providing the action previously described in connection with the relay circuit of Fig. 4. Thus, to summarize, when a long ring pulse is applied to the device of Fig. 5, the relay will not operate until the current is applied for substantially more than one second. Once the relay operates, it closes the bell circuit and adds a holding capacity $C_2$ in the circuit. Thus, the relay will hold over the seven-second pause period and all subsequent ringing pulses will ring the bell. The circuit will discriminate against the two short rings as follows: When the first one-second pulse is applied to the device, the relay will not operate. However, during that one-second pulse, a charge was built up within capacitor $C_3$. Unless that charge is expended during the one-second pause between short rings, the next one-second pulse will operate the relay. I provide this discharging action by using at $C_3$, a capacitor of the smallest capacity consistent with its ability to provide the required delay action, and a comparatively low resistance relay. Thus, although the relay circuit, including $C_3$ and $R_1$, is such that it will delay action of the relay for a period of slightly more than one second, it will discharge $C_3$, through the relay, in a fraction of the second required for the pause between the two short rings. Thus, the next one-second ringing pulse will not charge $C_3$ sufficiently to operate the relay, and inasmuch as the pause between the complete ringing signal is four seconds, it is obvious that the relay will not operate. Thus is provided the discrimination against the two short rings. Such a device installed at J–1 of Fig. 1 would provide discrimination action in passing the one long ring for that station, and in blocking the two short rings when J–2 is called. In these devices, the rectifiers used are preferably those of the selenium type which are both extremely compact and inexpensive, but any other type of proper design may be used if desired.

In the circuit of Fig. 5, I have incorporated with the circuit of Fig. 4 relay controlled contact means for supplying additional capacity to the relay circuit for providing a time delay or holding action to said relay after pick up. In Fig. 6 I show a further modification of the circuit of Fig. 4, comprising the relay controlled contact means of Fig. 5 for supplying additional resistance in the relay circuit, to provide a time delay or holding action to said relay after pick up. Thus, in Fig. 6 the relay coil 40 controls the armature 41, picking up said armature when the coil is energized. The relay 40—41 is shown in a de-energized condition with back contacts 42—43 closed through the armature. When the relay is energized, armature 41 is lifted away from said contacts 42—43 thereby throwing into the relay circuit the resistor $R_2$ which is normally short circuited when the relay is de-energized. This circuit operates as follows: When the ringing current is applied across terminals G and R, current will flow through the relay 40—41, at the same time charging capacitor $C_2$. However, the components of the circuit are such that there will be a delay in operation of a predetermined period. If the current pulse is removed before operation of the relay, the charge which has built up within $C_2$ will be quickly discharged through the relay, and the resistance $R_2$ will have no effect upon the discharge rate, inasmuch as it is shorted out by contacts 42 and 43. However, once the relay has operated, contacts 42 and 43 will open, and the resistance $R_2$ will be placed in the discharge circuit. The relay will then hold for a period, the length of which will be dependent upon the capacity of $C_2$ and the resistance of $R_2$.

From a comparison of the circuits of Figs. 4, 5, and 6, it will appear that the condenser in the subscriber station of the circuit of Fig. 5 is associated with the rectifier $S_2$ of that figure in the same relation as are the condensers $C_1$ of Figs. 4 and 6 with the rectifier $S_2$ of those figures to provide for the proper charging and discharging of the station condenser.

Although I have explained how my invention operates by placing a component having appreciable resistance in series with the bell circuit of the subscriber station, it is obvious that the discriminator circuits of my invention can also be applied across the telephone line. For example, my invention could be placed in the circuit as shown in Fig. 7. In this case, with a few minor changes, the discriminator circuit is, basically, the same circuit illustrated in Fig. 5. Whereas in Fig. 5 the relay coil 30 and resistor R of the device are initially in series with the bell, in Fig. 7 the relay and resistor are connected across the line between the G and ring terminals on the fuse block while the bell circuit is open at 52. Operation would be basically the same, the only disadvantage of this arrangement, and a minor one at that, is that there will be present in the telephone during use, a slight ground current hum. However, this can be eliminated without difficulty if so desired. It is also to be pointed out that throughout my illustrations I have shown the devices connected to the ring side of the telephone circuit. It is obvious that in making an installation at those sets connected to the tip side of the line, installation would be the same except that terminal R of my device would then be connected to the tip terminal on the fuse block. In the circuit of Fig. 7 it will be noted that the condenser $C_2$ is normally not in the relay circuit when the relay is de-energized, but is placed in circuit when the relay armature 32 picks up, to move contact 50 into engagement with contact 51. The reason for this is as follows: The capacity provided by $C_2$ is required to provide a predetermined minimum holding period after operation of the relay. Although, off hand, it would appear that the condenser might be included in the circuit at all times, such an arrangement would be impracticable for, if this added capacity were to be permanently included in the circuit, it would provide an additional delay action which would throw off the timing as provided by the condenser $C_3$ and the resistor $R_1$.

This increased delay action could, in turn, be off-set by decreasing the resistance of $R_1$. However, in doing so, more current would flow through the relay and its associated components, resulting in a heavier load on the telephone line. In view of the very limited current capacity of the telephone line, this would result in a voltage drop sufficient to prevent operation of the relay. With the arrangement as shown, however, this added capacity, which is not immediately required, is provided when it is needed, after the relay has once operated.

Figures 8, 9, 10:
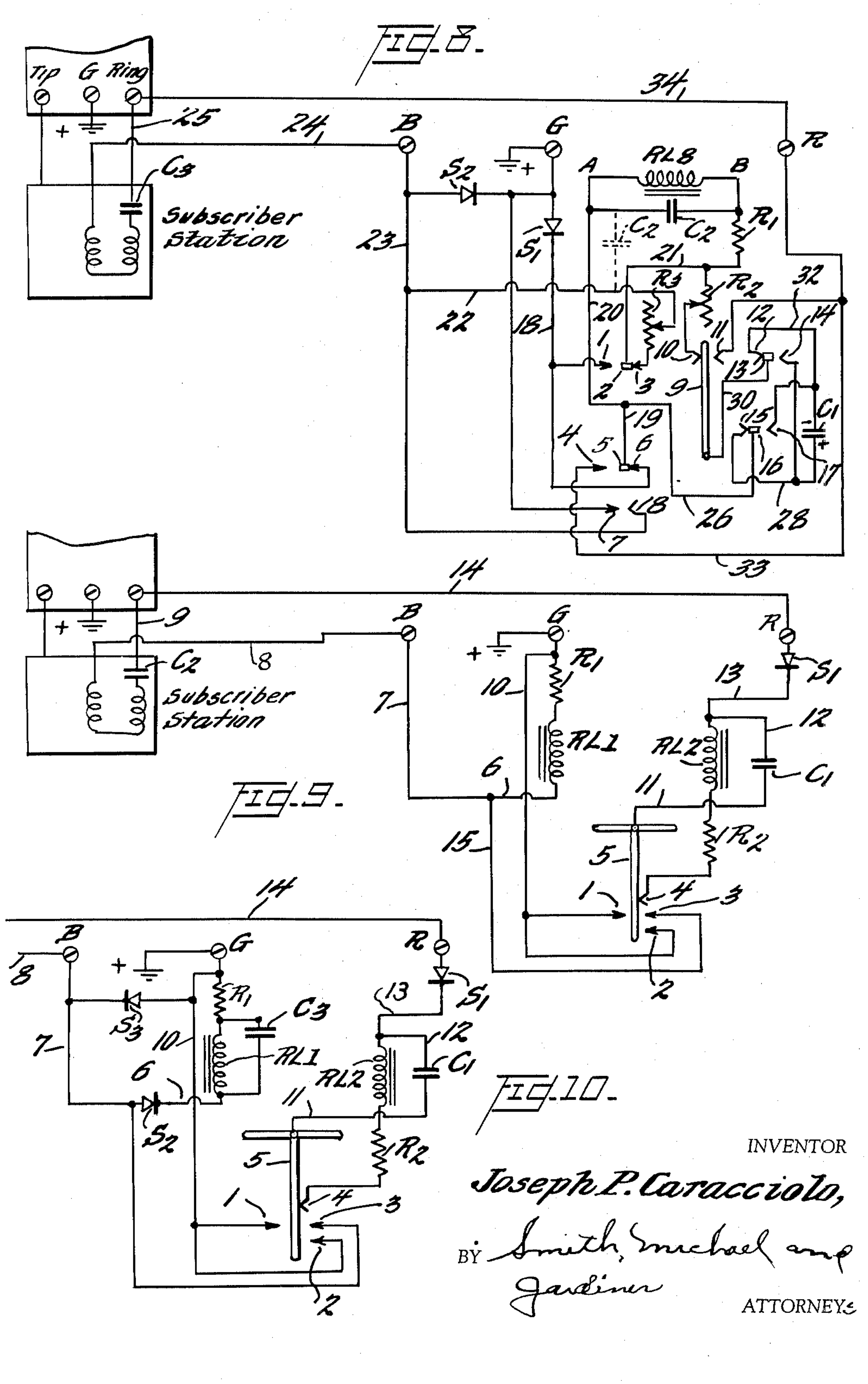
Fig. 8 shows diagrammatically a form of discriminator circuit employing a polarized relay.
Fig. 9 shows diagrammatically a form of discriminator circuit employing a relay having both alternating current and direct current operating coils.
Fig. 10 shows diagrammatically a slightly modified form of the circuit shown in Fig. 9.

Fig. 8 illustrates a pause-discriminating circuit which can be made to discriminate either against the two short rings or against the one long ring, while passing the desired signal. In this circuit, I use a single relay of the polarized type. As a pause-discriminating circuit, discriminating against the one long ring and passing the two short rings, operation is as follows: As previously explained, there may be at all times a D. C. potential across the ring and ground terminals on the fuse block, the ground having a positive polarity and the ring having a negative polarity. Assuming that a two-ring signal appears across ground and ring, during the half cycle when ground is negative, a current will flow from the ground terminal on my device, through the rectifier $S_1$, along conductor 18, to contact 6, to contact 5, along conductor 19, along conductor 20, through the relay coil RL–8, through resistane $R_1$, along conductor 21, to contact 2, across to contact 3, through adjustable resistance $R_3$, along conductor 22, to conductor 23, to terminal B on my device, along conductor 24, through the bell of the subscriber station, through $C_3$, along conductor 25 and to the positively charged ring terminal. Although current will be flowing through the bell, there will be no ringing as a result of the voltage drop through the high resistance relay coil RL–8, and resistance $R_1$ and $R_3$. However, the current flowing will be sufficient to operate the sensitive relay RL–8 and the armature 9 thereof will be so magnetically polarized that the flow of current through the coil from A to B will cause said armature to move toward the right as viewed in Fig. 8. It is to be noted that during the same time, current will flow from the ground terminal on my device, through rectifier $S_1$, along conductor 18, to contact 6, across to contact 5, along conductor 19, to conductor 26 to contact 16, across to contact 15, along conductor 28, to condenser $C_1$, through $C_1$ to conductor 32 to contact 12, across to contact 13, along conductor 30, to contact arm 9, to contact 10, through resistance $R_2$ to conductor 21 to contact 2, across to contact 3, through adjustable resistance $R_3$, along conductor 22, to conductor 23, to terminal B on my device, along conductor 24, through the bell, through $C_3$, along conductor 25 and to the positively charged ring terminal. During this time, the capacitor $C_1$ need not be considered, inasmuch as it will have a negligible effect on the initial operation of the relay for the following reasons: Capacitor $C_1$ is preferably of the "dry" electrolytic type which must have the voltage applied across it properly polarized in order for any charge to develop. If the polarities are reversed, only a small, inconsequential charge will develop. In addition, it will be noted that this current must flow through resistances $R_2$ and $R_3$, resulting in a small charging current. As a result of these resistances and the reversed polarity of the current being applied across $C_1$, no charge of any consequence will develop. It is obvious, of course, that during the application of A. C. ringing current to the device, when the ground terminal is positive and the ring terminal is negative, no current will flow through the relay circuit as a result of the rectifier $S_1$. Thus, the current applied to the relay circuit will always be of a constant polarity. Discharge of capacitor $C_3$ when ground is positive and ring is negative, will be through rectifier $S_2$ as previously described in connection with the circuit of Fig. 5. It is to be noted that before actuation and during actuation of the contact arm 9 toward the right, the negative polarity of the ringing current will be applied at A of the relay and the positive polarity of the ringing current will be applied at B of the relay. Thus the current will be flowing through the relay in the direction of A to B. Contacts 2 and 5 are so arranged that movement of the armature 9 toward the right will impart no movement to said contacts; but movement of contact arm 9 toward the left will shift contacts 2 and 5 toward the left also, bringing them in engagement with contacts 1 and 4, respectively. Conversely, movement of said contact arm toward the right will shift contacts 13 and 16 into engagement with contacts 14 and 17 respectively, and movement of said contact toward the left will be ineffective to move contacts 13 and 16. When the rectified ringing current is first applied to the relay, the flow of current is such that the contact arm will move toward the right. In so doing, it will close contact 13 with contact 14 and contact 16 with contact 17. In this position, $C_1$ will be charged with a properly polarized current. All this takes place during the first one-second pulse of the two-ring signal. When the first one-second pulse ceases and during the one-second pause which separates the two short rings, the relay becomes inoperative and the contact arm 9 returns to normal. Capacitor $C_2$ is included merely as a smoothing capacitor for the rectified current. Its capacitance is very small, and it will have very little effect on the operation of the relay other than to provide smooth relay operation.

When contact arm 9 returns to normal following cessation of the first pulse, it re-engages contact 10. At the same time, contacts 13 and 16 re-engage contacts 12 and 15. In the closing of these contacts, the charge in $C_1$ will be applied across the relay coil RL–8 in the following manner: From the negative side of $C_1$, to conductor 32, to contact 12, to contact 13 and along conductor 30, to contact arm 9, to contact 10, through resistance $R_2$, along conductor 21 through resistance $R_1$, through the relay coil to conductor 20, to conductor 26, to contacts 16 and 15, along conductor 28, and to the positive side of the capacitor $C_1$. It is to be noted that whereas during the ringing pulse, current flowed through the relay from A to B, it now flows from B to A. Thus, the charge in $C_1$ will operate the relay, causing the polarized armature to move now to the left as viewed in Fig. 8. This movement to the left takes place almost instantly upon contact of armature 9 with contact 10. Movement of said armature to the left will also close contacts 1 and 2 and 4 and 5, and, also, bell contacts 7 and 8. Contacts 1 and 4 are provided to reverse the relay coil connections for the following reasons. During the first pulse, it was desired that current flow through the coil from A to B in order that the contact arm 9 move toward the right. However, once the contact arm has moved toward the left, it is necessary that all subsequent ringing pulses flow through the relay in the opposite direction in order that said relay will continue to hold that position during ringing. Thus, after the movement of the contact arm 9 toward the left, and during the half-cycles when ground is negative and ring is positive, current will flow from ground, through $S_1$, along conductor 18, to contact 1, to contact 2, along conductor 21, through $R_1$, through the relay coil from B to A, along conductor 20, to conductor 19, to contacts 5 and 4, along conductor 33 to the R terminal on my device, along conductor 34 and to the ring terminal on the block. All subsequent ringing currents will flow from B to A, recharging $C_1$ and permitting the relay to hold its left hand position. All this action has taken place during the one-second pause after the first one-second pulse. The next one-second pulse will find bell contacts 7 and 8 closed and ringing of the bell will result. The value of $C_1$ is such that with proper adjustment of $R_2$, the relay will hold in the left hand position for a period substantially more than four seconds (the pause between complete short ring signals), but less than seven seconds. Therefore, with a pause between complete short ring signals of four seconds, the relay will continue to hold, ringing the bell of the station telephone with each pulse.

Discrimination against a one long ring signal is accomplished by the circuit of Fig. 8 as follows: When the first long-ring pulse appears, the contact arm 9 will move to the right and charge $C_1$. When the first ringing pulse ceases, the arm 9 will return to normal, make contact with contact 10, and under the influence of the charge in $C_1$ move to the left, closing bell contacts 7 and 8. However, the components of the relay circuit are designed so that it will not hold for a period as long as seven seconds, and, further, inasmuch as the pause between long rings has been assumed to be seven seconds, it is obvious that arm 9 will return to normal, re-opening bell contacts 7 and 8 before the next ringing pulse appears. Subsequent pulses will repeat the above-described action and the bell will not ring. It is to be noted that $R_3$ is removed from the circuit upon actuation of arm 9 to the left. The purpose is to reduce the resistance in the relay circuit once $C_1$ is introduced into the circuit to provide sufficient current to recharge $C_1$ after the first pulse has operated the relay as already described.

By increasing the capacity of $C_2$ and by reconnecting it in the circuit as shown "ghosted" in Fig. 8, this very same circuit can be made to discriminate against the two short rings and pass the one long ring. As such, operation would be as follows: When the first long ring pulse appears, the relay armature will move to the right, charging $C_1$ as already described, and, at the same time, charging capacitor $C_2$. When the ringing ceases, the arm 9, instead of returning to normal as previously described, will, under the influence of the charge in $C_2$, remain actuated in the right-hand position. The values of $C_2$ and $R_1$ and $R_3$ will be such that the relay will hold in this position for a period substantially more than four seconds but less than seven seconds. With the long ring signal being applied, there will be a pause of seven seconds between rings, but inasmuch as the relay will not hold in the right-hand position for seven seconds, it will eventually return to normal and, making contact with contact 10, the arm 9 will move toward the left, closing among others, the bell contacts 7 and 8. Whereas the relay circuit of Fig. 8 as previously described discriminates against the long ring signal so that the relay would hold the left position for less than seven seconds, in this case $R_2$ is adjusted so that it will hold in the left hand position for a period substantially more than seven seconds. Therefore, after the seven-second pause which follows the first ringing pulse, the next ringing pulse will find the arm 9 still in the left hand position, thus recharging $C_1$ and, at the same time ringing the bell with the second and subsequent ringing pulses. Discrimination against the two short rings would be as follows: When the first one-second pulse appears, the relay will operate to the right as already described. During the one-second pause, the arm 9 will not return to normal due to the holding action of $C_2$. The second one-second pulse will recharge $C_1$ and $C_2$ and during the four-second pause which follows each complete two short-ring signal, the arm 9 still will not return to nromal because $C_2$ will hold for a period substantially more than four seconds. Thus, inasmuch as the arm 9 cannot be attracted to the left, contacts 7 and 8 cannot close and the bell cannot ring. $C_2$, in addition to providing the right hand holding action, also acts as a smoothing capacitor for the rectified relay current. It is to be noted that once arm 9 is attracted to the left, $C_2$ is taken out of the circuit, and $C_1$ is introduced into the circuit. Thus, each operates independently of each other. Finally, I might point out that the only contacts that move with arm 9 are contacts 2 and 5 which move to the left when arm 9 moves to the left, and contacts 13 and 16 which move to the right when arm 9 moves to the right. They are shown in the illustration in their normal position.

Fig. 9 illustrates a further circuit which can be made to discriminate against the pauses of either the long ring signal or the two short-ring signal. The circuit, as shown, will discriminate against the long ring and pass the two short rings. This circuit differs from my other circuits in that it uses a single relay with two solenoid coils and one armature which can move to the left or right, depending upon which solenoid coil is energized. As viewed in my illustration, the core of the solenoid on the left is similar to the core of the solenoid on the right except that it is provided with the commonly known "shading" coil to permit A. C. operation. As a circuit passing the two short rings, operation is as follows: When the first one-second ringing pulse appears across ground and ring, current will flow from the ground terminal on my device, through resistor $R_1$, through the A. C. coil RL–1, along conductor 6, to conductor 7, to terminal B on my device, along conductor 8, through the bell of the subscriber station telephone set, through $C_2$, along conductor 9, and to the ring terminal. Inasmuch as this current is not rectified, current will flow in both directions. However, the bell will not operate as a result of the voltage drop across $R_1$ and the relay coil. During this period, the armature 5 will be attracted by the A. C. coil RL–1 and the contact arm 5 will move to the left, closing with contact 1. In this position, current will flow from the ground terminal on my device, along conductor 10 to contact 1, through arm 5 to conductor 11, to capacitor $C_1$, through $C_1$ to conductor 12, to conductor 13, through $S_1$, to terminal R and to the ring terminal on the fuse block by way of contact 14. Thus, it is seen that $C_1$ receives a charge. No current will flow through the D. C. coil of the relay due to the opening of contact 4. When the first one-second pulse ceases, and during the one-second pause, the arm 5 will return to normal, and in closing with contact 4, will place the charge of $C_1$ across the D. C. coil, immediately attracting the armature and moving arm 5 to the right. In so doing, it closes contacts 3 and 2. The values of $C_1$ and $R_2$ are such that the relay will hold this position for a period substantially more than four seconds, but less than seven seconds. Thus, when the second one-second pulse appears and is followed by the four-second pause, the relay will continue to hold in that position, permitting current to flow from ground, along conductor 10, to contact 2, through arm 5 to contact 3, along conductor 15, to conductor 7, to terminal B, along conductor 8, through the bell and $C_2$, along conductor 9 and to the ring terminal. Thus, the full voltage will be applied and the bell will ring with each subsequent ringing pulse. When a long ring pulse appears across the circuit, operation will be the same except that arm 5 will release from the right-hand position during the seven-second pause which separates the long ring signals. Thus, the bell contact 3 will not be closed during any long-ring pulse, and the bell cannot ring. If it is desired to use this circuit to discriminate against the two short rings and pass the one long ring, there is included in the circuit the components $S_2$, $S_3$, and $C_3$ as shown in Fig. 10. The current flowing through the left hand coil, as viewed in Fig. 10 will now be D. C. instead of A. C. $S_2$ is included in the circuit to rectify the current; $S_3$ is placed in the circuit to discharge the station condenser $C_2$ as already described in connection with my circuits illustrated in Fig. 4 and Fig. 5. $C_3$ is included to provide the necessary holding action. Operation is as follows: When a long ring pulse appears across the device, current will flow through the A. C. coil RL–1 as already described. I might point out that this A. C. coil will operate equally as well on direct current. When the A. C. coil is energized, the armature is attracted and arm 5 moves to the left, closing contact 1 and charging capacitor $C_1$. When the ringing pulse ceases, the value of $C_3$ is such that the charge in $C_3$ will continue to energize the A. C. coil RL–1, holding the arm 5 in the left position for a period substantially more than four seconds but appreciably less than seven seconds. Thus, during the seven-second pause which follows the first long ring pulse, the arm 5 will eventually release, return to normal, and, upon making contact with contact 4, move toward the right under the influence of the charge in $C_1$ which now flows through the D. C. coil. The values of $C_1$ and $R_2$, in this case, are such that they will hold the arm 5 in the right hand position, for a period substantially more than seven seconds. Thus, when the next long ring pulse appears, it will recharge $C_1$ and, inasmuch as bell contact 3 is closed, the bell will ring. After the first ringing pulse, the A. C. coil can no longer be energized, inasmuch as the current now going to the bell no longer flows through the coil RL–1, but instead flows through conductor 10 which by-passes said coil. Discrimination against the two short rings takes place as follows: When the first one-second pulse appears, it will energize the A. C. coil RL–1 and move arm 5 toward the left. At the same time, it charges $C_3$ which will hold arm 5 in this position for a period substantially more than four seconds. After the one-second pause and the next one-second ring, there will be a pause of four seconds. However, inasmuch as the arm 5 will not release during the pause, each set of two short rings will recharge $C_3$, continuing to hold arm 5 and preventing its closing with contact 3. Thus, the bell cannot ring.

Figure 11:
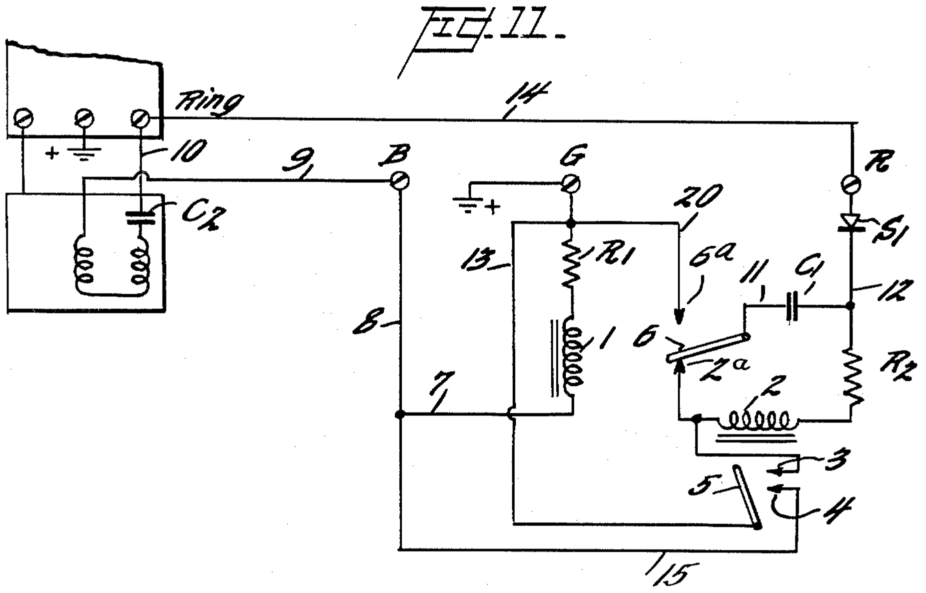
Fig. 11 shows diagrammatically a modified discriminator circuit based on the features included in the circuits of Fig. 2 and Fig. 3.

Fig. 11 shows a further discriminator circuit which is a modification of the circuits illustrated in Fig. 2 and Fig. 3. Whereas in Figs. 2 and 3, current will flow through relay coil 13 as soon as relay coil 7 is energized, in the circuit of Fig. 11 no current flows through relay coil 2 when relay coil 1 is first energized. Instead, initial energization of relay coil 1 will charge $C_1$, which is introduced into the circuit of relay coil 2 when relay coil 1 is de-energized and its armature 6 returns to normal. This is a pause discriminating circuit and will discriminate against the one long ring and pass the two short rings, operation is as follows: When the ringing current appears across the ground and ring terminals at the fuse block, current will flow from the ground terminal on my device, through dropping resistor $R_1$, through relay coil 1, along conductor 7 to conductor 8, to terminal B, along conductor 9, through the bell and to $C_2$, through $C_2$ and along conductor 10 to the ring terminal. This current will energize relay coil 1, closing contact arm 6 with contact 6*a*. In this position, current will flow from the ground terminal on my device, through conductor 20, to contact 6*a*, across the contact arm 6, along conductor 11, through $C_1$, along conductor 12, through rectifier $S_1$, to the ring terminal, to conductor 14, and to the ring terminal on the fuse block. When the first one-second pulse ceases, arm 6 of relay 1—6 returns to normal, closing arm 6 with contact 2*a* and placing the charge in $C_1$ across relay 2—5. Relay 2 is instantly actuated, closing arm 5 thereof with contacts 3 and 4. In this case, the values of $C_1$ and $R_2$ are such that relay 2—5 will hold for a period of more than four seconds but less than seven seconds. Thus, during the four-second pause which follows the second one-second ring, relay 2—5 will continue to hold and ringing current will now flow from ground, along conductor 13, to arm 5, to contact 4, along conductor 15, to conductor 8, to terminal B, along conductor 9, and to the bell. Thus, the bell will ring. At the same time, current will also flow from ground along conductor 13, to arm 5, to contact 3, through relay 2, through $R_2$, along conductor 12, through $S_1$, along conductor 14 and to the ring terminal on the block. Thus, each subsequent ringing current will energize the holding circuit for relay 2—5. Relay 1—6, of course, cannot operate after the first pulse, inasmuch as the bell circuit made through conductor 13 and contact 4 and conductor 15 will now bypass it.

Figure 12:
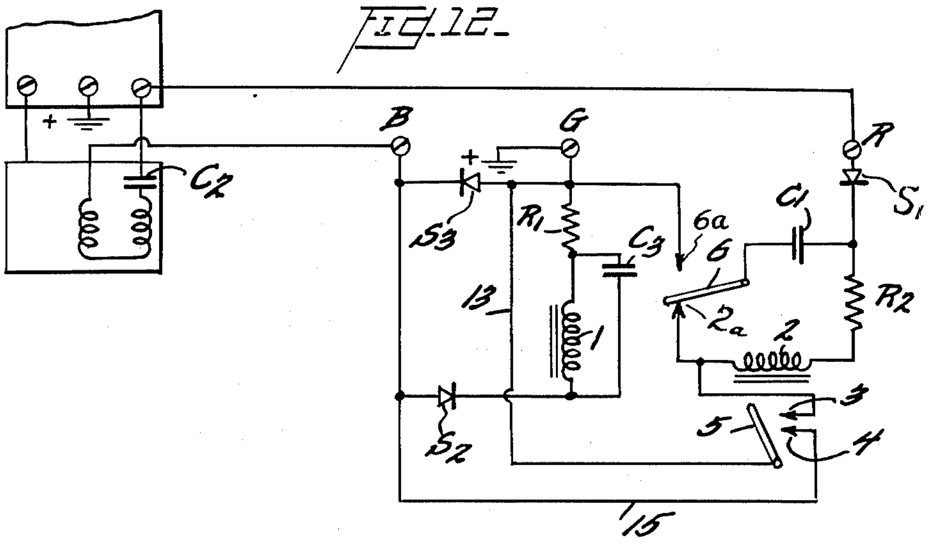
Fig. 12 shows diagrammatically a slightly modified form of the circuit shown in Fig. 11.

This same circuit can be made to discriminate against the two short rings and pass the one long ring. To achieve this, I add capacitor $C_3$, rectifiers $S_2$ and $S_3$ as shown in Fig. 12. $C_3$ provides a holding action for relay 1—6. $S_2$ rectifies the bell current through relay 1—6 and $S_3$ provides the discharging action for $C_2$ as previously described. Operation is as follows: When the first long ring pulse appears, current will flow through relay coil 1 and armature 6 thereof will be actuated, charging $C_1$ as already described. The value of $C_3$ is such that there will be a holding period of more than four seconds but less than seven seconds for relay 1—6 when the first ringing pulse ceases. Thus, during the seven second pause which follows each long ring, relay 1—6 will eventually return arm 6 to normal and place the charge in $C_1$ across relay coil 2, operating that relay as already described. The values of $C_1$ and $R_2$ are such that once actuated, relay 2 will hold for a period of more than seven seconds. Thus, the next long-ring pulse will find relay 2—5 actuated with arm 5 closed with contacts 3 and 4, and the bell will ring with each subsequent pulse, at the same time recharging the circuit of relay coil 2. Discrimination against the two ring signal is as follows: When the first one-second pulse appears relay 1—6 will be actuated as already described. During the one-second pause between short rings, relay 1—6 will continue to hold. After the next one-second ring, there will be a four-second pause. However, inasmuch as relay 1—6 will hold for more than four seconds, the next complete two short ring signal will find relay 1—6 still in an actuated condition. Thus, each subsequent ringing pulse will recharge the circuit of relay coil 1 and inasmuch as the bell cannot ring until arm 5 of relay 2—5 is actuated, the bell will not ring.

By way of emphasizing the adaptability of my invention, I wish to refer here to a slight modification by which my discriminator circuits may be made to operate in a manner so that only one ringing pulse of a two short-ring signal will be effective to operate the station ringer of a station such as J–2 when equipped with my invention. It is obvious that the primary purpose for providing the two short ring signal as distinguished from a one long ring signal is to permit the respective subscribers to recognize the ringing signals assigned to them. I may, without in anywise hampering the ability of the respective subscribers to distinguish their individual signals, modify the time delay components of the relay, such for instance the relay RL–2 of Fig. 9, so that one of the signal current pulses of a two short ring signal will be utilized in setting up the relay, without operating the station ringer, the relay, when so set up, operating to deliver the second ringing pulse to the ringer to sound the same and then drop out so that this same sequence of operation will be repeated and thus sound the station ringer only once for each two short current pulses received by the station equipment. Thus, referring to Fig. 9, the capacity of the condenser $C_1$ is made so that, once the coil RL–2 is energized, it will hold the armature 5 attracted or picked up for a period of more than one second, but less than the four seconds intervening between repeated signals. With the condenser $C_1$ so designed, the first one-second current pulse will be effective in coil RL–1 to attract the armature 5, making contact at 1 to charge condenser $C_1$ as already described. During the one-second pause which follows the first current pulse, the armature 5 will return to normal and then be attracted in the opposite direction by the coil RL–2 under the influence of the discharge from condenser $C_1$. The condenser $C_1$ will then hold the armature 5 attracted for a period of more than one second (the break between the two short current pulses). Thus, upon arrival of the second one-second current pulse, $C_1$ will be recharged, and at the same time the station ringer will be sounded. Having in mind the capacity of the condenser $C_1$ is such as to hold the armature for a period less than four seconds, the armature 5 will return to normal position before the arrival of the next current pulse. Thus, only one of each two current pulses of a two short ring signal will be effective to operate the station ringer. This will reduce the ringing of the station equipment without interfering with the selectivity of a system equipped with my invention.

The foregoing description of my invention has been predicated on the assumption that the multi-party telephone line serves but four parties, namely, stations J–1, J–2, W–1, and W–2. It is to be understood, however, that the invention is not so limited, and may be readily applied to a multi-party line wherein six or more subscriber stations are served by a single line. Thus, if an added station such as J–3 is connected to the system such as shown in Fig. 1, and there is operatively associated with said station a discriminator circuit of my invention such as shown in Fig. 2, wherein the time delay components of the second relay circuit are modified to correspond to another code ringing signal differing from those assigned to station J–1 and J–2 (and/or W–1 and W–2), the system may be rendered fully selective in accordance with the teachings of this invention. Thus, if the subscriber station identified as J–3 be given a code signal of one long ring of three seconds duration repeated after a pause of twelve seconds, and the circuit components $C_1$, $R_3$, and $R_4$ associated with relay coil 13 of Fig. 2 be designed to give the relay a delayed pick up of more than two seconds and a delayed release of more than twelve seconds, the system including the station J–3 will be rendered entirely selective within the teachings of the present invention. Obviously, a further station W–3 might be connected to the same multi-party line between tip and ground and a similarly modified discriminator circuit as just described be operatively associated therewith.

It is obvious that by using different combinations of my pause discriminating and pulse discriminating circuits, party lines of more than four may be serviced with full selective signalling, simply, inexpensively, and without modification of the system whatsoever.

It will be understood that while I have shown in Fig. 1 only a single fuse block serving the several subscribers' stations attached to the multi-party line, if desired an individual fuse block may be employed in connection with each subscriber station, and connected between it and the telephone line to the exchange.

It is also to be understood that although I have shown lag and holding actions by capacity-resistance circuits, my invention need not be restricted to the types of relays illustrated. Relays designed with self-contained lag and holding characteristics could be used, for example. Also, it may be possible to use thermal relays to operate with my invention.

It will be understood by those skilled in the art that the series connection of my discriminator circuits with the subscriber station equipment and more particularly the series connection of the first relay of the discriminator circuit with the station ringer, is important particularly from the standpoint that it functions to maintain said relay coil in a closed circuit without a "short" appearing across the telephone line, so that the usual test equipment used by service men may be employed in a conventional manner, even though the subscriber station is equipped with the subject matter of the present invention.

Persons skilled in the art of telephony, and particularly persons familiar with actual conditions encountered on a rural party telephone line, recognize that, in spite of all precautions, taken by the telephone companies to maintain substantially constant the voltage on such systems, there are nevertheless frequent and substantial fluctuations in such voltages which may tend to interfere with the proper operation of sensitive relays. I therefore provide means to be optionally included in the circuits previously described which will stabilize the operation of the relays included therein where such equipment is to be used under conditions in which it will be subject to substantial variations in voltage. It is, of course, well known that in present day practice a line voltage of substantially 50 volts D. C. is always present between ground and ring and between ground and tip. The means for accomplishing this is conventional and is included in the block legended "telephone exchange," in Fig. 1 although not specifically shown therein. When ringing current is supplied to a called station, a ringing voltage of substantially 100 volts A. C. is connected in series with the line voltage. Theoretically, this gives a maximum peak voltage of 150 during one-half of the A. C. cycle and a minimum low voltage of 50 during the other half of the A. C. cycle, but actually the real maximum is approximately 80 volts and the minimum substantially less than 50 volts, with the ring (or tip) negative and the ground positive during the half cycle when the voltage is at maximum. With the rectifiers connected as shown in Figs. 2, 3, 5, 7, 9, and 11, current flows therethrough only when the ring line, or tip line) is positive, that is, when the ringing current actually supplied to the station equipment is at a minimum. Thus, the relays such as relay 13 of Figs. 2 and 3, relay 30 of Figs. 5 and 7, relay RL–2 of Fig. 9, and relay 2 of Fig. 11, which are actuated by ringing current pulses, may function erratically when either line or ringing voltages fluctuate. In order to stabilize the operation of such relays under fluctuations in line and/or ringing voltages, I propose to reverse the connections to the rectifiers included in the circuits previously described to permit the flow of current to the associated relays only during the half cycle when the ring line (or tip line) is negative, that is, when the ringing voltage actually supplied to the station equipment is at a maximum. I also propose to include in the relay energizing circuits normally open automatic switch means in the form of neon lamps or "glow switches," which may be calibrated to "close" only when the potential applied thereto exceeds a predetermined amount, such as 60 volts. Thus, the relay will be supplied with voltage of a value such that proper and uniform operation thereof at all times is insured, in spite of fluctuations in line and/or ringing voltage, while preventing the 50 v., D. C. line voltage from reaching the relays and affecting them adversely.

Thus, in Fig. 13 I show the essential portions of the circuit of Fig. 2 modified to the extent that the connections to the rectifier S have been electrically reversed and to include a normally open automatic switch in the form of a "glow switch" or neon lamp NL connected beween ground G and the contact 14 of relay 7 and in shunt relation across the normally open relay contacts 8—14. The automatic switch NL obviates the necessity for the contact 20 of relay 13 and line 21 of Fig. 2 and therefore these are not included in Fig. 13, since the condenser $C_1$ may now be charged directly through the neon lamp NL to keep relay 13 energized between ringing pulses. While the resistance of NL will reduce the effective charging voltage applied to the condenser $C_1$, it is quite ample to "hold" the relay once it has "picked up."

In Fig. 14, I have shown the essential portions of the circuit of Fig. 3, similarly modified by electrically reversing the connections to the rectifier $S_1$ and by including a normally open automatic switch, such as a neon lamp NL connected between ground G and contact 14 of relay 7 and in shunt relation across the normally open relay contacts 8—14. Also, the auxiliary charging circuit for condenser $C_1$ comprising the contact 20 of relay 13, line 21, and back contacts 22 and 23 of relay 7 shown in Fig. 3, have been eliminated in Fig. 14. To include a "glow switch" NL in the circuit of Fig. 5, it is necessary only to connect it in series in line 36 between R and contact 4 of relay 30. This arrangement is shown in Fig. 15.

To similarly modify the circuit of Fig. 7, a "glow switch" NL may be connected in series between R and coil 30 (in place of the un-referenced condenser shown in Fig. 7), and this arrangement is shown in Fig. 16. This will eliminate the necessity for the connection shown in Fig. 7 extending between G and R and including the rectifier $S_2$. The connections to the rectifier $S_1$ as shown in Fig. 7 are also electrically reversed in Fig. 16. The operation of this modified circuit is the same as that of Fig. 7 in respect to relay 30, but has the added advantage of eliminating the ground circuit hum mentioned previously in connection with the description of the circuit of Fig. 7.

In Fig. 17 I have shown the essential portions of the circuit of Fig. 9 modified to include the "glow switch" NL in series in line 13 between coil RL–2 and rectifier $S_1$ the connections to said rectifier as shown in Fig. 9 being electrically reversed in Fig. 17.

In Fig. 18 I show the essential portions of the circuit shown in Fig. 11 modified to include the neon lamp NL between G and condenser $C_1$ and connected between line 20 and line 11 to thus shunt the contacts 6—6A of relay 1. The connections to the rectifier $S_1$ as shown in Fig. 11 have been electrically reversed in Fig. 18. These changes permit elimination of the charging circuit for condenser $C_1$ including contact 3 of relay 2 present in the circuit shown in Fig. 11.

In all of the modifications shown in Figs. 13 to 18 inclusive, it will be understood that the normally open "glow switches" are chosen with a conducting to non-conducting differential such that only voltages in excess of substantially 60 volts (exceeding the normal 50 volts D. C. line voltage) are passed to the energizing circuit of the relays and/or condensers associated therewith. Thus, when the voltage across ground to ring or across ground to tip falls to less than 60 volts, as when substantially no ringing current is present on the line, the line through NL is open due to the fact that at such times NL is non-conducting. This precludes erratic operation of the relays due to uncontrolled and undesirable fluctuations in voltage in the line servicing the equipment of the present invention. Tests have shown that equipment including the modifications shown in Figs. 13 to 18, inclusive, will operate uniformly and accurately under conditions involving a 10% fluctuation in mean voltage, plus or minus, and this is a greater range of variation than is usually met with in actual practice.

It will be understood from the foregoing that the discriminator circuits of my invention may be operatively incorporated into the subscriber's station equipment with a minimum of time and trouble. The service man merely removes the conventional ground conductor which is connected to the ground terminal on the fuse block and reconnects it to the B terminal of the discriminator circuit, as shown in the various figures. He then connects a lead from the G terminal of the discriminator circuit to the ground terminal on the fuse block from which the previously mentioned cord conductor has been removed, and finally connects the lead from the R terminal of the discriminator circuit to the ring side of the fuse block. In connecting a discriminator circuit of my invention to a subscriber station on the tip side of the line, the same procedure is followed except that the tip terminal of the discriminator circuit is connected to the tip terminal of the fuse block. While the discriminator circuits shown in the various figures of the drawings are designed for connection to the ring side of the line, it will be understood that the only difference between the circuits as shown and the circuits as connected to the tip side of the line is that the R terminal of the discriminator circuit would be, in the latter instance, identified by T for tip rather than R for ring.

From the foregoing it will be appreciated by those skilled in the art that the discriminator circuits of my invention may be readily and operatively associated with the conventional subscriber station equipment of a multi-party telephone line without requiring the change or substitution of any of the standard equipment, and that subscriber stations, when equipped with my invention, will be rendered fully selective in response to conventional code ringing signals repeatedly transmitted over the line from the telephone exchange. It is to be understood that while I have illustrated and described herein preferred embodiments of my invention, various changes may be made therein without departing from the spirit of the invention as set forth more particularly in the appended claims.

This application is a continuation-in-part of my application Serial No. 243,333, filed August 23, 1951.

I claim:

1. In a telephone system, a party line, a plurality of subscriber stations connected to said party line, each of said subscriber stations having a code signal, means for selectively transmitting over said party line repeated alternating current code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit means of each subscriber station including a first relay having a coil operatively connected between ground and one side of said line, a second relay having a coil, a normally open energizing circuit for the coil of the second relay, a normally open contact on said first relay for closing said normally open energizing circuit of the second relay when said first relay is energized, a normally open ringer energizing circuit, and contact means on said second relay for closing the ringer energizing circuit when the second relay is energized and said first relay is de-energized.

2. The apparatus described in claim 1 wherein said first relay coil is connected in series with said ringer, and wherein said normally open ringer energizing circuit bypasses said first relay coil to connect the ringer directly to ground when said ringer energizing circuit is closed, and normally open back contact means on the first relay included in the ringer energizing circuit.

3. The apparatus described in claim 1 wherein said second relay has time delay means connected thereto to hold said second relay energized through intervening pauses of predetermined duration in the transmitted code signal.

4. The apparatus described in claim 1 wherein the first relay of said subscriber stations is quick acting on both pickup and release, time delay means operatively connected to said second relay of said subscriber stations, said time delay means of the respective subscriber stations being correlated with respect to each other whereby to render the same responsive to code ringing signals having predetermined patterns of ringing current pulses and intervening pauses.

5. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit of each subscriber station including a first relay having a coil operatively connected in series with said ringer and between ground and one side of the line, a second relay having a coil, a normally open energizing circuit therefor, a contact on said first relay for closing said normally open coil energizing circuit when said first relay is energized, a normally open ringer energizing circuit bypassing said first relay coil to connect the ringer directly to ground when said ringer energizing circuit is closed, and contact means on said first and second relays for closing said normally open ringer energizing circuit following energization and release of said first relay, and a normally open holding circuit for the coil of said second relay, said holding circuit including normally closed contact means on said first relay and normally open contacts on the said second relay.

6. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit means of each of said subscriber stations including a quick-acting relay connected in series with the ringer between ground and one side of the line and including an armature connected to ground, said quick-acting relay having a normally open front contact, a slow-acting relay having an energizing circuit controlled by said normally open front contact on the quick-acting relay, said slow-acting relay having a normally open front contact, circuit means connecting said normally open front contact of said slow-acting relay to said ringer in bypassing relation to said quick-acting relay, a back contact on said quick-acting relay normally connected to said grounded armature, circuit means connecting said last-mentioned contact to the armature of the slow-acting relay for connecting the ringer directly to the line through said bypass circuit around the quick-acting relay, and a holding circuit for the slow-acting relay including back contact means on said quick-acting relay and front contact means on said slow-acting relay.

7. A discriminator circuit for ringer equipped subscriber stations on a multiple party telephone line comprising a first relay adapted to be connected between one side of said line and ground, said relay including a normally closed back contact, a second relay adapted to be connected between one side of said line and ground, normally open circuit means controlled by said first relay for energizing said second relay, a normally open ringer energizing circuit, and contact means on said second relay for closing said normally open ringer energizing circuit through said normally closed back contact of the first relay when the second relay is energized and said first relay is de-energized, and a normally open holding circuit for energizing said second relay following release of the first relay, said holding circuit including normally closed back contact means on the first relay.

8. The apparatus described in claim 7 wherein time delay means are included in the holding circuit of said second relay to hold the same energized after release of the first relay for a length of time exceeding the duration of a pause between successive current pulses of a code signal on said line in which the ringing current pulses and intervening pauses are of predetermined duration, respectively, to thereby selectively pass signal current pulses from the line to said ringer and to reject the current pulses in a signal having intervening pauses that exceed in duration the holding time of said time delay means.

9. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, at least one of said discriminator circuit means including a polarized relay having a coil and an armature movable thereby in either of two directions from an intermediate normal position, normally closed relay contacts for initially energizing said relay to move the armature in one direction, a normally open ringer energizing circuit, contact means on the relay for closing the ringer energizing circuit to deliver signal current direct to the ringer when the relay is energized to move the armature in the opposite direction, a time delay circuit including a condenser normally in circuit with the relay, contact means on the relay for charging the condenser upon energization of the relay in said one direction, a discharge circuit for the condenser including contact means on the relay for discharging the condenser through the relay in the opposite direction upon release of the armature at the end of a signal current pulse to thereby move the armature in the opposite direction and close the ringer energizing circuit, said time delay means including a resistance for regulating the discharge time of the condenser to maintain the relay energized in said opposite direction through an intervening pause of predetermined duration.

10. The apparatus described in claim 9 wherein additional normally open contact means are provided on the relay, said additional contact means being closed when the relay is energized in said other direction and included in a circuit for reversing the direction of signal current from the line through the relay whereby to maintain the ringer energizing circuit closed during subsequent signal current pulses.

11. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, at least one of said discriminator circuit means including a relay having a first and a second energizing coil and a T-shaped armature magnetically coupled to both of said coils, one of said coils when energized moving the armature in one direction and the other of said coils when energized moving the armature in an opposite direction, a normally open ringer energizing circuit, a condenser, a normally open energizing circuit for the condenser, a normally closed energizing circuit for said first coil, normally open relay contacts operable when said first coil is energized to close the circuit to the condenser to charge the same, normally closed relay contact means for connecting the condenser for discharge through said second coil when the armature is in released position, relay contact means for closing the ringer energizing circuit when the armature moves in response to energization of the second coil, and time delay means in circuit with the condenser to retard the discharge thereof and maintain the second coil energized throughout an intervening pause of predetermined duration between successive signal current pulses.

12. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit means of at least one of said subscriber stations including a first relay having a coil operatively connected between ground and one side of the line, a second relay having a coil operatively connected to one side only of the line, a condenser, a normally open charging circuit for the condenser, a contact on said first relay operable when the first relay is energized to close said condenser charging circuit, a condenser discharge circuit including said second relay coil, a normally closed relay contact in said condenser discharging circuit opened by said first relay when energized and a ringer energizing circuit including a normally open contact on the second relay which is closed when said second relay is energized by the condenser discharge to thereby deliver code signal current pulses directly to the ringer.

13. The apparatus described in claim 12 wherein time delay means are included in said condenser dischrage circuit to maintain the second relay energized through intervening pauses of predetermined duration.

14. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, each of said discriminator circuit means including a relay connected between one side of said line and ground through said ringer, a normally open ringer energizing circuit bypassing said relay for connecting the ringer directly to ground, a second relay having a front contact for closing said ringer energizing circuit, and time delay means operatively associated with said second relay to render said second relay slow to pickup whereby the application of signal current pulses to said ringer energizing circuit is dependent upon the duration of the signal current pulses transmitted over said line, said time delay means of the several subscriber stations being correlated to render said relays responsive respectively to code signals in which the duration of the signal current pulses and of the intervening pauses correspond to different predetermined patterns.

15. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit of each subscriber station including a first relay having a coil operatively connected in series with said ringer and between ground and one side of the line, a second relay, having a coil, a condenser connected in shunt with the coil of said second relay, a normally open energizing circuit for said second mentioned coil, a front contact on said first relay for closing said normally open coil energizing circuit for said second coil when said first relay is energized, a normally open ringer energizing circuit bypassing said first relay coil to connect the ringer directly to ground when the ringer energizing circuit is closed, and contact means on said first and second relays for closing said normally open ringer energizing circuit following energization and release of said first relay, an auxiliary discharge circuit for said condenser including normally closed back contact means on said first and said second relays, and a normally open holding circuit for said second relay including front contact means on said second relay for closing said holding circuit when said second relay is energized.

16. The apparatus described in claim 1 wherein said first relay coil is connected in series with said ringer and a resistor, and wherein said normally open ringer energizing circuit bypasses said first relay coil and resistor to connect the ringer directly to ground when said ringer energizing circuit is closed.

17. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station and discriminator circuit means at each subscriber station responsive respectively only to one predetermined code signal to pass said code signal to the ringer of the associated subscriber station, the discriminator circuit means of each subscriber station including a first relay having a coil operatively connected between ground and one side of said line, a second relay having a coil, a normally open energizing circuit for the coil of said second relay, a contact on said first relay for closing said normally open energizing circuit of the second relay when said first relay is energized, a normally open ringer energizing circuit, and contact means on said second relay for closing the ringer energizing circuit when said second relay is energized and said first relay is de-energized, a circuit component having appreciable IR drop connected in series with the coil of the first relay and with the ringer, said normally open ringer energizing circuit bypassing said series-connected coil and circuit component to connect the ringer directly to ground when the ringer energizing circuit is closed by said contact means on said second relay.

18. In a relay circuit adapted for connection to a source of potential including both alternating current and direct current components, a relay coil, a condenser connected in shunt relation therewith, a first rectifier having its discharge side connected for delivery to one end of the shunt connected relay coil and condenser, a second rectifier having its inlet side connected to the opposite end of the shunt connected relay coil and condenser and having its discharge side connected to the inlet side of said first-mentioned rectifier, and a second condenser having one side thereof connected to the inlet side of said second rectifier and to the said opposite end of the shunt connected relay coil and condenser, with the other side of said second condenser forming one terminal of the circuit and the connected ends of the two rectifiers forming the other terminal of the circuit.

19. A current pulse discriminator circuit for a ringer equipped subscriber station on a multiple party telephone line comprising a first relay, a second relay, energizing circuits for both of said relays, means including a condenser operatively connected to the second relay for rendering the same slow to pickup, normally open contacts on said first relay for closing the energizing circuit of said second relay, said first relay being quick to pickup and quick to release, a normally open ringer circuit, normally open contacts on said second relay for closing said ringer circuit when said second relay is energized and the first relay is de-energized, and a discharge circuit for the condenser including normally closed contacts on the first relay, to discharge accumulated charges on the condenser from successive ringing current pulses which are of a duration less than the pickup period of the second relay.

20. In a telephone system, a party line, a plurality of subscriber stations connected to said party line, each of said subscriber stations having a code signal, means for selectively transmitting over said party line repeated code signals each comprising current pulses separated by intervening pauses with the duration of the current pulses and pauses being of different time duration for each code signal, a ringer at each subscriber station responsive respectively only to one predetermined code signal to pass said code signal to the ringer of the associated subscriber station, the discriminator circuit means of each subscriber station including relay means having a first coil operatively connected between ground and one side of the line, and a second coil, a normally open energizing circuit for said second coil, a contact on the relay for closing said energizing circuit for the second coil when said first coil on said relay means is energized, a normally open ringer energizing circuit, and a contact on said relay means for closing said ringer energizing circuit when said second coil is energized and said first coil is de-energized.

21. The apparatus described in claim 20 wherein said first coil of said relay means is connected in series with said ringer and wherein said normally open ringer energizing circuit bypasses said first coil of the relay means to connect the ringer directly to ground when said ringer energizing circuit is closed, and contact means controlled jointly by said first and second coils of said relay means for closing said normally open ringer energizing circuit following energization and de-energization of said first coil of the relay means.

22. The apparatus described in claim 20 wherein the relay means of all of said subscriber stations is quick acting on both pickup and release in response, respectively, to energization and de-energization of said first coil, time delay means operatively connected to the second coil of the relay means of all of said subscriber stations, said time delay means of the respective subscribers' stations being correlated with respect to each other, whereby to render the same individually selectively responsive to code signal pulses having predetermined patterns of current pulses and intervening pauses.

23. The apparatus described in claim 1 wherein an auxiliary energizing circuit is provided for the second relay, said auxiliary energizing circuit being operatively connected between ground and the coil of the second relay in shunt relation to the normally open contact of the first-mentioned relay, said auxiliary energizing circuit including a series connected gaseous element which is nonconducting to telephone voice currents in said party line but which is conducting to code signal currents in said party line.

24. The apparatus described in claim 20 wherein an auxiliary circuit is provided for energizing the second-mentioned coil of the relay means, said auxiliary circuit being operatively connected between ground and said second-mentioned coil, said auxiliary circuit including a series connected gaseous element which is nonconducting to telephone voice currents on said party line but is conducting to signal currents on said line.

25. The apparatus described in claim 1 wherein a rectifier is connected in series in said energizing circuit for the second-mentioned relay, said rectifier being electrically connected to pass signal current pulses to said energizing circuit from the party line only during half cycles when the polarity of the party line is positive.

26. The apparatus described in claim 1 wherein an auxiliary energizing circuit is provided for the second-mentioned relay, said auxiliary energizing circuit being operatively connected between ground and one end of the coil of said second-mentioned relay in shunt relation to the normally open contact of the first-mentioned relay and including a series connected gaseous element which is nonconducting to telephone voice currents in said party line but which is conducting to code signal currents in said party line, and a rectifier connected between the other end of the coil of the second relay and the party line so as to pass signal current pulses through said auxiliary energizing circuit only during half cycles when the polarity of the party line is negative.

References Cited in the file of this patent

UNITED STATES PATENTS

| | | |
|---|---|---|
| 1,756,097 | Niles et al. | Apr. 24, 1930 |
| 1,783,295 | Levy | Dec. 2, 1930 |
| 1,812,641 | Powell | June 30, 1931 |
| 1,942,404 | Ashbrook | Jan. 9, 1934 |
| 2,108,909 | Vincent | Feb. 22, 1938 |
| 2,549,688 | Jones | Apr. 17, 1951 |